United States Patent [19]

Bruner

[11] Patent Number: 5,056,092
[45] Date of Patent: Oct. 8, 1991

[54] COMPUTER SYSTEM MONITOR AND CONTROLLER

[75] Inventor: Robert W. Bruner, Phoenix, Ariz.

[73] Assignee: Motorola, Inc., Schaumburg, Ill.

[21] Appl. No.: 345,937

[22] Filed: May 1, 1989

[51] Int. Cl.⁵ .............................................. G06F 11/00
[52] U.S. Cl. ...................................... 371/14; 371/5.5; 371/16.1
[58] Field of Search ...................... 371/14, 66, 62, 5.5, 371/16.1, 16.4, 18, 28; 364/184, 424.03, 550, 551.01, 200 MS File, 900 MS File

[56] References Cited

U.S. PATENT DOCUMENTS

| | | | |
|---|---|---|---|
| 3,757,302 | 9/1973 | Pollitt | 371/14 |
| 3,964,018 | 6/1976 | Strait | 371/28 X |
| 4,016,408 | 4/1977 | Koetzle | 371/28 X |
| 4,549,296 | 10/1985 | Castel | 371/14 X |
| 4,653,445 | 3/1987 | Book | 123/198 DC |
| 4,757,505 | 7/1988 | Marrington | 371/66 |

Primary Examiner—Robert W. Beausoliel
Attorney, Agent, or Firm—Dale E. Jepsen; Walter W. Nielsen

[57] ABSTRACT

A computer system monitor and controller is provided which, in response to certain command input signals, logic signals and sensor input signals, shuts off power to a computer either immediately or after the computer's operating system has accomplished a controlled shutdown procedure.

6 Claims, 5 Drawing Sheets

COMPUTER SYSTEM MONITOR AND CONTROLLER

BACKGROUND OF THE INVENTION

This invention relates, in general, to system monitors and controllers and, more particularly, to a computer system monitor and controller which, in response to certain command input signals and sensor inputs, shuts off power to a computer system either immediately or after the computer's operating system has accomplished a controlled shutdown procedure.

There are currently available various hardware failure detectors and annunciators as well as environmental sensors and computer operating system controlled shutdown procedures. However, there is no single system which combines inputs from all of these sources with operator commands in order to provide a computer system monitor and controller which provides for an automatic orderly shutdown of a computer operating system followed by a controlled hardware system shutdown or in certain cases an immediate hardware system shutdown when required.

SUMMARY OF THE INVENTION

It is therefore an object of the present invention to provide a computer system monitor and controller which interprets operator command inputs, environmental sensors, and various hardware failure inputs to provide a predetermined orderly computer system shutdown.

Another object of the present invention is to provide a computer system monitor and controller for multiple computer systems which provides remote failure annunciations and allows remote command and control of individual computers in a multiple computer system.

It is still further an object of the present invention to provide a computer system monitor and controller which in response to certain predetermined inputs provides an immediate computer system hardware shutdown regardless of the potential adverse effects on any software system contained therein.

The above and other features and objects are provided in the present invention wherein there is provided a system monitor and controller module comprising a microcontroller, a control panel and a tone generator. An interruptor module is coupled to the system monitor and controller for coupling to a VME bus. Multiple environmental sensors and local control switches are also coupled to the system monitor and controller.

In addition the computer system monitor and controller is coupled to a remote communications port as well as a main power supply and an auxiliary power supply.

BRIEF DESCRIPTION OF THE DRAWINGS

The above mentioned and other features of the invention and the manner of attaining them will become more apparent and the invention itself will be best understood by reference to the following description of an embodiment of the invention taken in conjunction with the accompanying drawings wherein.

DETAILED DESCRIPTION OF THE DRAWINGS

Figure 1:
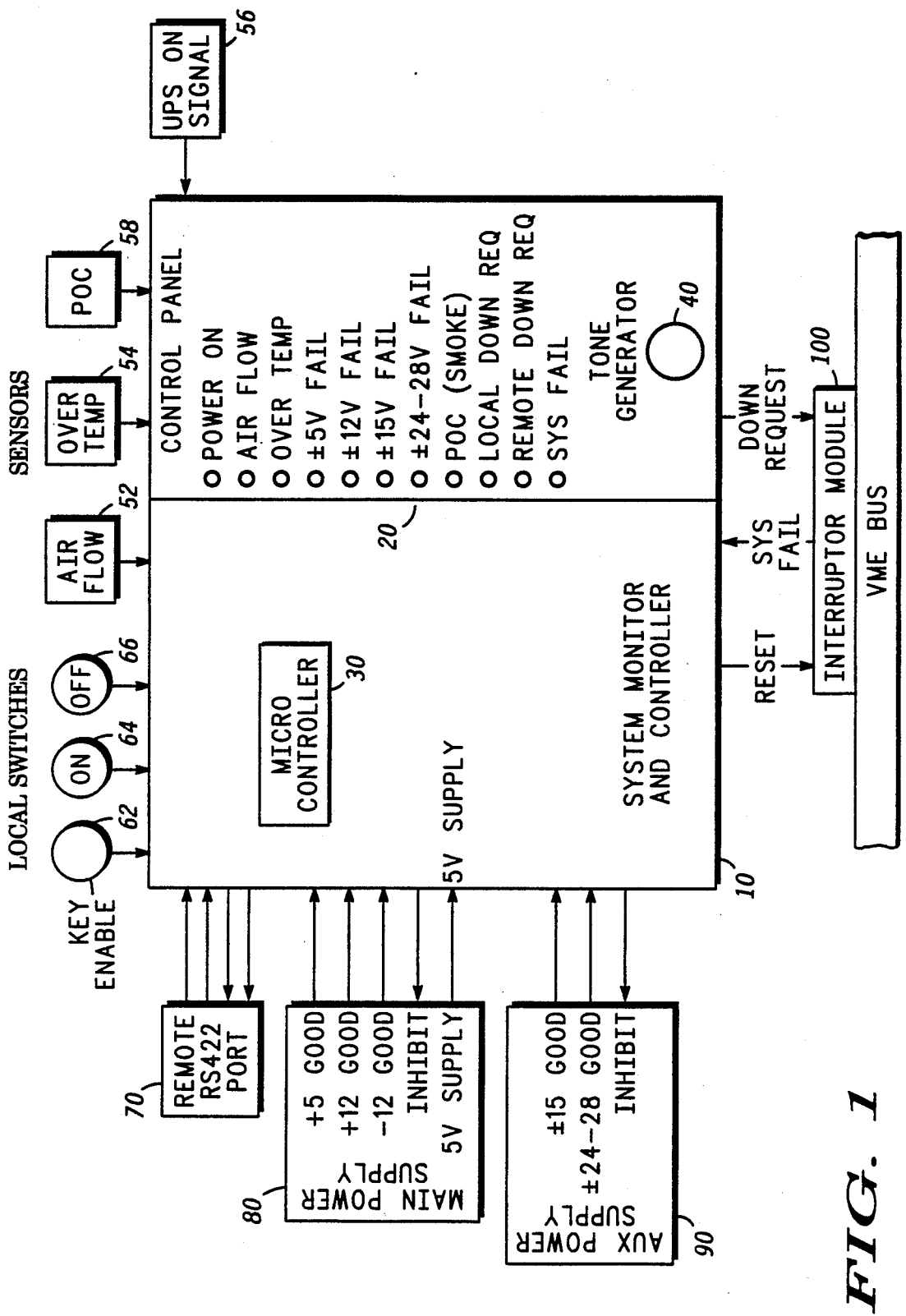
FIG. 1 is a block diagram of a preferred embodiment of the present invention.

FIG. 1 illustrates simplified block diagram of the present invention wherein the computer system monitor and controller comprises system monitor and controller 10 having a microcontroller 30, tone generator 40, and control panel 20 having LED annunciators to indicate power-on, air flow, overtemp, plus 5 volt fail, plus/minus 12 volt fail, plus/minus 15 volt fail, plus/minus 24-28 volt fail, POC (smoke), local down request, remote down request, and system fail annunciators. Air flow sensor 52, overtemp sensor 54, uninterruptable power supply (UPS) on 56, and particles of combustion (POC) 58 sensors are coupled to system monitor and controller 10 as are key enable 62, on 64, and off 66 local switches. RS 422 port 70 is coupled to system monitor and controller 10 as are main power supply 80 and auxiliary power supply 90. Main power supply 80 provides logic signals to indicate the condition of the plus 5 volt and plus/minus 12 volt main power supplies as well as providing a five volt power supply to system monitor and controller 10. Auxiliary power supply 90 provides logic signals to indicate the condition of the plus/minus 15 volt and plus/minus 24-28 volt auxiliary power supplies to system monitor and controller 10. Control of the main and auxiliary power supplies by system monitor and controller 10 is provided via inhibit signals to the main and auxiliary power supplies. Interruptor module 100 is coupled to a VME bus and system monitor and controller 10 for receiving reset and down request commands from system monitor and controller 10 and providing a system fail signal to system monitor and controller 10.

Figure 2:
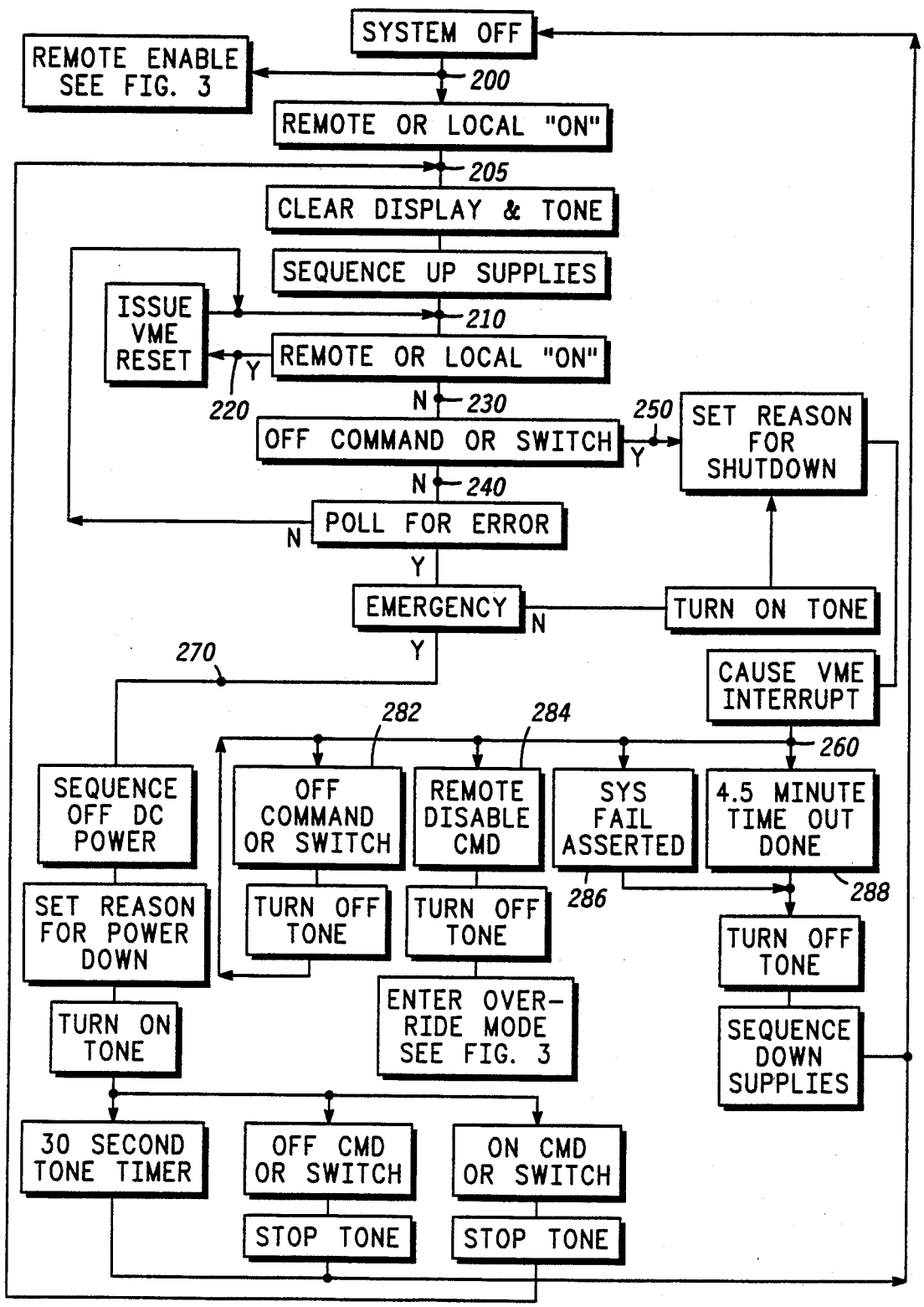
FIG. 2 is a flow chart showing the monitor and control logic of the present invention.

FIG. 2 is a flow chart illustrating the monitor and command logic programmed into microcontroller 30. Beginning at the top of FIG. 2, the system off block indicates the normal power off configuration at the beginning of a typical cycle. In this configuration the main circuit breaker to the computer system itself would be closed thereby providing the 5 volt supply from the main power supply to system monitor and controller 10. The power supplies would be off as a result of inhibit signals provided from system monitor and controller 10 to the main and auxiliary power supplies including the plus 5 volt, plus/minus 12 volt, plus/minus 15 volt and plus/minus 24-28 volt supplies. At this point, labeled as point 200 on the flow chart, a typical cycle begins with either a remote enable command, which will be discussed further in conjunction with FIG. 3, or a remote or local on signal. The local on command comes from local switch 64 of FIG. 1 and a remote on command comes via remote RS 422 port 70 to system monitor and controller 10.

In response to either of these commands the system clears any display indicated on the control panel and turns off tone generator 40 if it is on. The power supplies are then sequenced up with main power supply 80 being turned on first by removing the inhibit signal thereto followed by auxiliary power supply 90 being turned on by removing the inhibit signal thereto. At this point, indicated as point 210 on the flow chart, the system responds to a local or remote on command signal from switch 64 or remote port 70. If the remote or local on command signal is present the system branches to point 220 on the flow chart and in response thereto issues a VME reset signal via interruptor module 100 to the VME bus which is a command to the operating system to initiate a start-up sequence. Once the VME reset signal has been sent the system returns to point 210 on the flow chart again awaiting a remote or local on command.

If there is no local or remote on command present the system proceeds to point 230 on the flow chart looking for an off command which would be from either local switch 66 or via remote port 70. If there is no off command the system proceeds to point 240 on the flow chart and polls the system for error signals. The error signals monitored in this particular system include air flow sensor 52, over temp sensor 54, UPS on signal 56 and POC sensor 58. In addition, power supply valid signals from the main and auxiliary power supplies indicating the validity of the plus 5 volt, plus/minus 12 volt, plus/minus 15 volt and plus/minus 24-28 volt power supplies are monitored. If there are no errors indicated the system again returns to point 210 in the flow chart and, assuming no local on command is present, continues in the loop through point 230, point 240 and point 210 continuously monitoring for error inputs or command signals.

If at point 230 in the flow an off command is detected, the system proceeds to point 250 and sets the reason for the shut down which is also annunciated on control panel 20. If the shut down is in response to a command the local down request or remote down request annunciator would light depending on the source of the off command signal. The system would then cause a VME interrupt by sending a down request signal via interrupt module 100 to the VME bus. At this point, indicated as point 260 on the flow chart, there are various possible responses. At location 282 an off command or switch is indicated to turn off the tone. In this example this particular loop would not be used as the tone has not been turned on. The remote disable command at location 284 will be discussed in conjunction with FIG. 3.

One of the remaining two possible responses is a system fail asserted signal at location 286, which is a return from the operating system via the VME bus and interruptor module 100 to system monitor and controller 10 indicating that the operating system has accomplished its orderly shut down and is ready for power to be removed. Once this signal is received the system proceeds to turn off the tone, if it is energized, and to sequence down the power supplies. Auxiliary power supply 90 is disabled first by sending an inhibit signal thereto, followed by main power supply 80 being shut down in response to an inhibit signal thereto. At this point the system would return to the normal system off configuration with only the 5 volt supply being provided from the main power supply to system monitor and controller 10. The appropriate annunciator, either local down request or remote down request, would remain lit indicating the cause of the system shut down. If at point 260 in the flow chart the system fail signal is not received from the operating system within 4.5 minutes of the down request signal being sent to the operating system, system monitor and controller 10 proceeds to shut down the system anyway via the turn off tone and sequence down supply signals as indicated earlier returning to the normal system off condition.

If at point 240 in the flow chart an error is detected the system proceeds to determine whether or not the error detected is of an emergency nature. For this particular system the POC sensor 58 input, plus 5 volt main power supply, and plus 12 volt main power supply signals are predetermined to require emergency shut down and cause the system to proceed to point 270 on the flow chart. At this point system monitor controller 10 does not wait for a controlled operating system shut down but proceeds to immediately sequence off the auxiliary and main power supplies and set the reason for the power down, which in this case would be either a POC indication or a failure of the plus 5 or plus 12 volt power supply. The system monitor and controller then proceeds to turn on the tone and await the completion of either a 30 second timer or stop the tone in response to either an off command or an on command. If an off command is received the system stops the tone and returns to the normal system off configuration at the top of the flow chart. If an on command is received the tone is stopped and the system returns to the normal on command at point 205 in the flow chart.

If during the poll for error step the detected error was of a non-emergency nature the system proceeds to turn on the tone generator, set the reason for the shut down, initiate a VME interrupt signal to the operating system which would be a down request signal via interruptor module 100 to the VME bus, and again await a response at point 260 in the flow chart. In this particular case the tone has been turned on and the off command at location 282 could be used to disable the tone during the shut down sequence. As before the power supplies are sequenced down either as a result of a system fail signal being returned as indicated in block 286 or at the completion of a 4.5 minute elapsed time as indicated in block 288. At this point the tone is turned off and the power supplies are sequenced down as before thereby returning the system to the normal off configuration. An additional choice at point 260 is to initiate a remote disable command as indicated in block 284 which turns off the tone and places the system in the override mode as discussed below in conjunction with FIG. 3.

Figure 3:
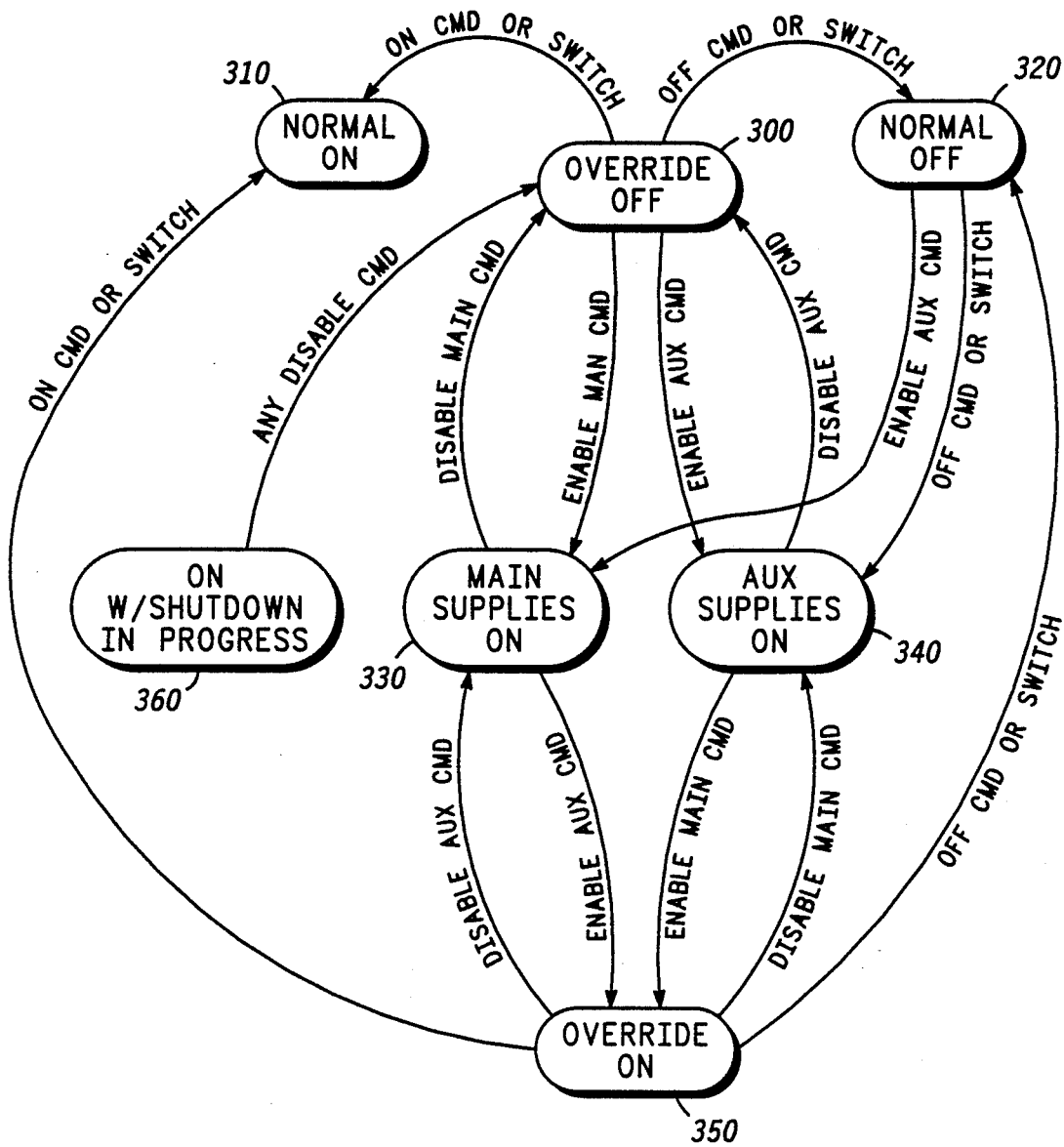
FIG. 3 is a flow chart showing the optional override mode of the present invention.

FIG. 3 is a flow chart illustrating the various states and commands possible during operation in the override mode. The normal system off configuration illustrated in FIG. 2 at point 200 would correspond to state 320 in FIG. 3. At this point an override mode can be entered by receiving either a main power supply enable signal or an auxiliary power supply enable signal via remote port 70. These signals come from a remote location and command the system to power up either the main or auxiliary supplies. In this override mode of operation the failure detection portions of the system are disabled and the supplies are turned on or off only in response to the various remote commands shown in FIG. 3.

For example, a remote enable signal for the auxiliary power supply moves the system from the normal off configuration at state 320 to the aux supplies on configuration shown at state 340. In this configuration the auxiliary power supplies are switched on by system monitor controller 10 and the normal sensor and valid signal monitors are disabled. From state 340 a remote main power supply command signal moves the system to override on state 350. In this configuration both power supplies are switched on. In a similar fashion remote main power supply enable and disable as well as auxiliary power supply enable and disable signals move the system to the various states shown.

In the override off stage shown at position 300 both power supplies are turned off and the monitor function is also disabled. Once in the override on mode, shown as state 350 with both power supplies on and the monitor function disabled, the system can be returned to either the normal off or normal on condition. This is accomplished using the remote off command or switch 66 to return to normal off state 320, or the remote on command or switch 64 to return to normal on state 310. These commands can in a similar fashion switch the system from override state 300 to either normal off state 320 or normal on state 310. In addition override off state 300 can be achieved by initiating a disable command from state 360 which is shown as a normal system on with a shut down in progress. This state corresponds to point 260 in FIG. 2 and the disable command corresponds to block 284 in FIG. 2 which turns off the tone and causes the system to enter the override mode or state 300 shown in FIG. 3.

The various functions shown in the flow charts of FIGS. 2 and 3 are accomplished in a microcontroller such as Motorola Part No. MC68HC805. The specific logic functions can, of course, be tailored to any particular computer system and may be firmware selected. The system as shown provides either operator commanded or automatic hardware and software shutdown to prevent damage to either the computer system hardware or operating system.

Figure 4:
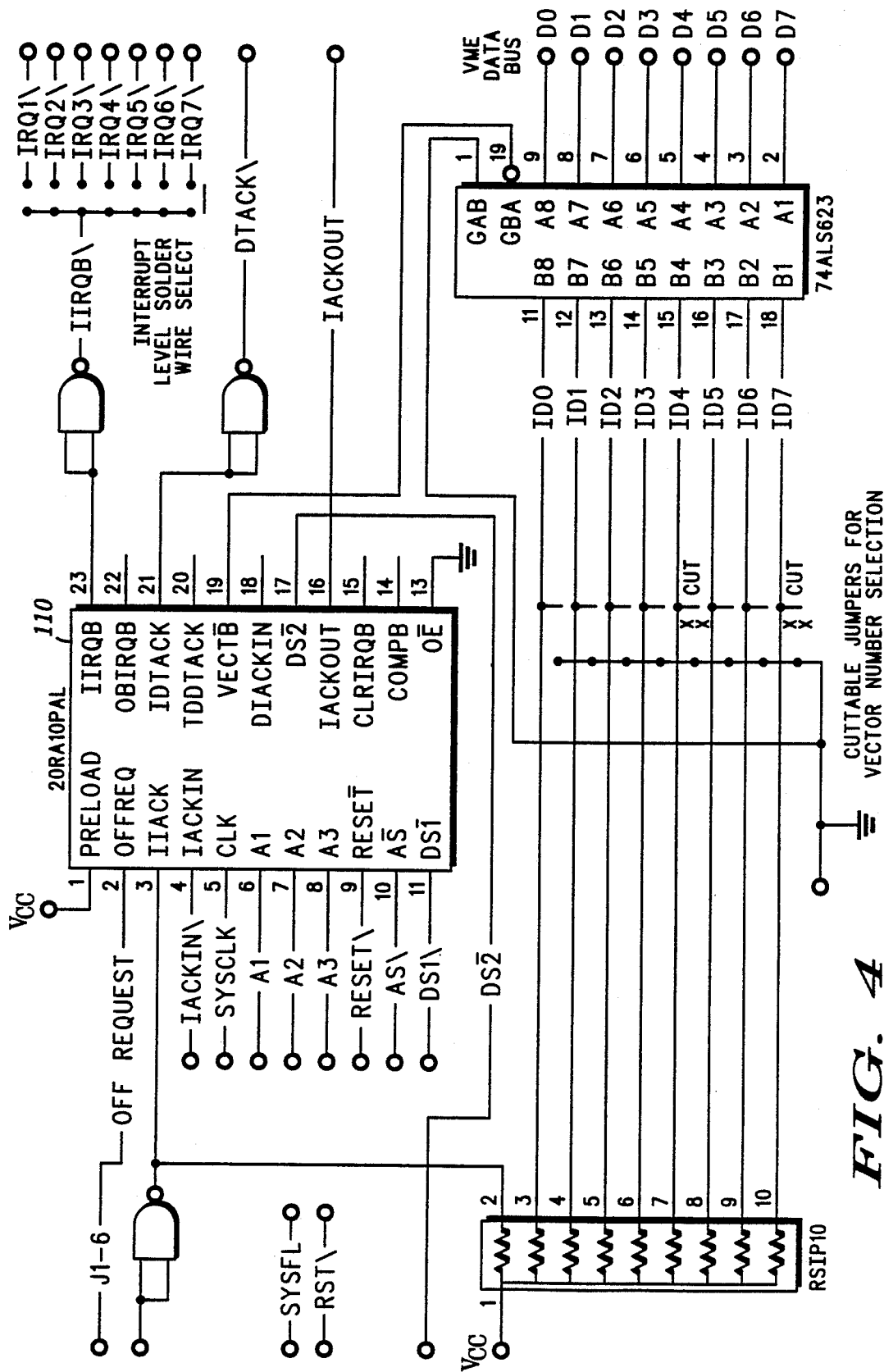
FIG. 4 is a schematic diagram of the interruptor module portion of the present invention.

A detailed schematic of interruptor module 100 is shown in FIG. 4 wherein the specific logic functions of the interruptor are implemented in PAL 110 which receives the off, or down request signal via J1-6. As can be seen, the system fail and reset signals are simply passed through interruptor module 100 for direct connection between system monitor and controller 10 and the VME bus.

Figure 5:
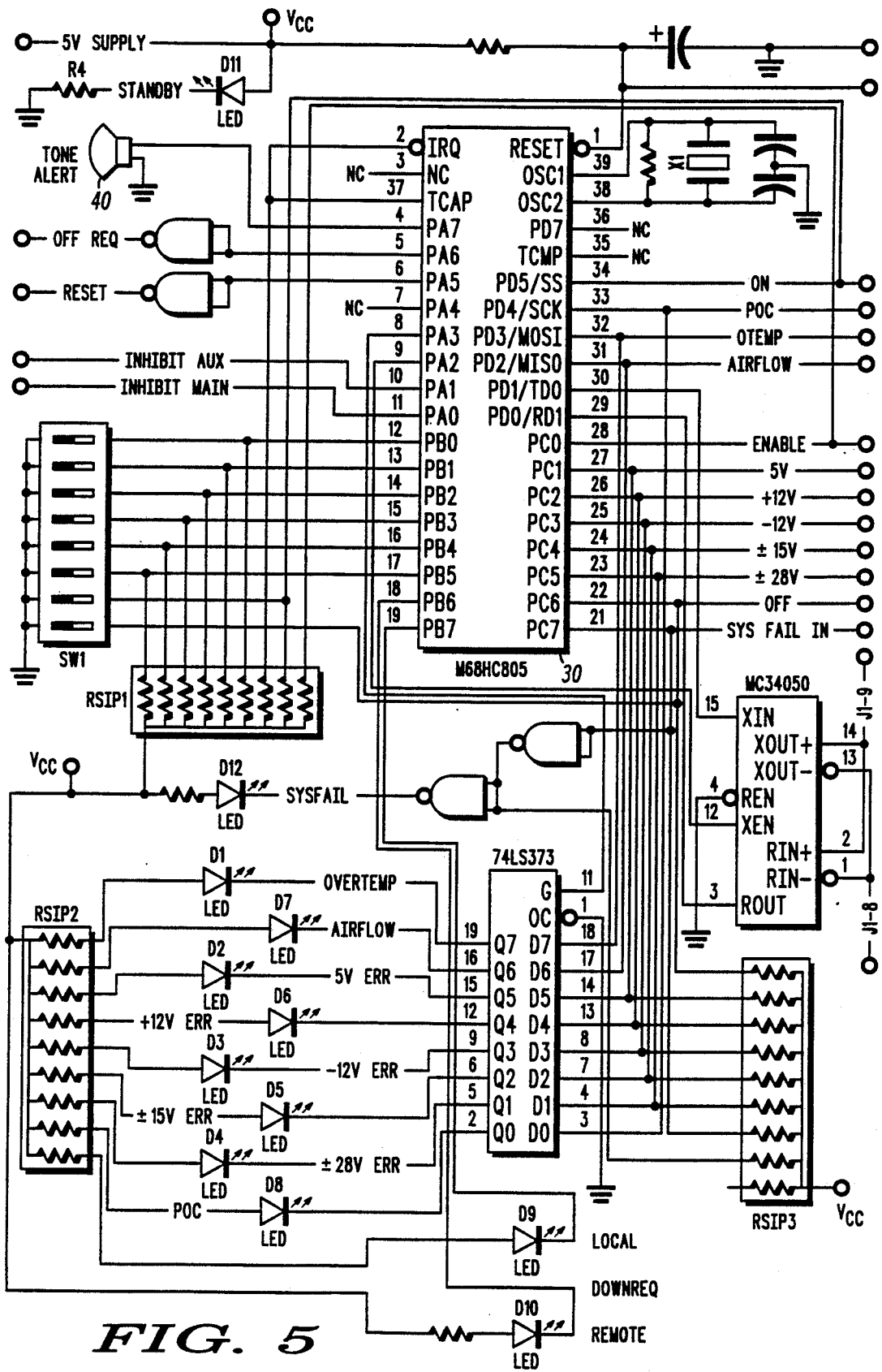
FIG. 5 is a schematic diagram of a preferred embodiment of the present invention.

A more detailed schematic diagram including the major components of system monitor and controller 10 is shown in FIG. 5. Microcontroller 30 and tone generator 40 are shown as well as the various input and output signal connections as in FIG. 1. Light emitting diodes D1-D11 are used as the control panel annunciators shown in FIG. 1 and line transceiver 72 provides the remote RS422 port to microcontroller 30 via J1-8 and J1-9.

What has been provided therefore is a computer system monitor and controller which receives power supply valid signals, sensor signals, and remote or local operator command signals and in response thereto provides an orderly operating system shutdown procedure followed by a hardware power supply shutdown. In certain predetermined cases an immediate hardware power supply shutdown is provided.

While there have been described above the principles of the invention and specific configurations in conjunction with specific devices and systems, it is to be clearly understood that this description is made only by way of example and not as a limitation of the scope of the invention.

What is claimed is:

1. A computer system monitor and controller comprising:
   system monitor and controller means for coupling to at least one power supply of a computer system having an operating system with a controlled shutdown procedure;
   sensor means for detecting one or more abnormal conditions of said computer system, coupled to said system monitor and controller means;
   communications bus interface means coupled to said system monitor and controller means for coupling to said operating system of said computer system; and
   control means, coupled to said system monitor and controller means, for providing operator command signals to said system monitor and controller means;
   wherein said system monitor and controller provides an immediate shutdown signal to said at least one power supply in response to signals from said sensor means indicating certain predetermined ones of said abnormal conditions and provides a delayed shutdown signal to said at least one power supply in response to either certain predetermined signals from said control means or signals from said sensor means indicating certain other predetermined ones of said abnormal conditions; and
   wherein said control means comprises a plurality of switches and further comprises remote access means for providing command signals from a remote location.

2. A computer system monitor and controller in accordance with claim 1 for coupling to a plurality of power supplies wherein said shutdown signals are provided in a predetermined sequence.

3. A computer system monitor and controller in accordance with claim 1 further comprising annunciator means, coupled to said system monitor and controller means, to indicate which of said signals from said control means or signals from said sensor means has caused a given shutdown.

4. A computer system monitor and controller in accordance with claim 1 further comprising audio alarm means, coupled to said system monitor and controller means, to indicate that a shutdown procedure is in progress.

5. A computer system monitor and controller in accordance with claim 1 wherein said delayed shutdown signal is provided after a shutdown request signal is sent to said computer operating system from said system monitor and controller means and a response signal is received by said system monitor and controller means from said computer operating system indicating that said controlled shutdown procedure has been accomplished.

6. A computer system monitor and controller in accordance with claim 1 wherein said system monitor and controller means comprises a microcontroller.

* * * * *